United States Patent [19]
Liou

[11] Patent Number: 6,007,785
[45] Date of Patent: Dec. 28, 1999

[54] APPARATUS FOR EFFICIENT OZONE GENERATION

[75] Inventor: Huei Tarng Liou, Taipei, Taiwan

[73] Assignee: Academia Sinica, Taipei, Taiwan

[21] Appl. No.: 09/081,845

[22] Filed: May 20, 1998

[51] Int. Cl.⁶ .............................. B01J 19/08; B01J 19/12
[52] U.S. Cl. ................................ 422/186.07; 422/186.04
[58] Field of Search ...................... 422/186.07, 186.08, 422/186.14, 186.18, 186.19, 186.3, 186.04

[56] References Cited

U.S. PATENT DOCUMENTS

| | | | |
|---|---|---|---|
| 4,603,031 | 7/1986 | Gelbman . | |
| 4,985,213 | 1/1991 | Ooe et al. ........................ | 422/186.01 |
| 5,052,382 | 10/1991 | Wainwright ..................... | 128/202.25 |
| 5,186,907 | 2/1993 | Yanagi et al. .................... | 422/186.3 |
| 5,366,703 | 11/1994 | Liechti et al. . | |
| 5,538,695 | 7/1996 | Shinjo et al. . | |
| 5,573,733 | 11/1996 | Salama ............................. | 422/186.18 |
| 5,635,059 | 6/1997 | Johnson .......................... | 210/192 |
| 5,785,824 | 7/1998 | Kitayama et al. ................ | 204/176 |
| 5,810,978 | 9/1998 | Nakatsuka et al. . | |

FOREIGN PATENT DOCUMENTS

| | | |
|---|---|---|
| 0 579 060 | 1/1994 | European Pat. Off. . |
| 0 765 839 A2 | 4/1997 | European Pat. Off. . |

OTHER PUBLICATIONS

Eliasson et al., "Ozone Synthesis from Oxygen in Dielectric Barrier Discharges," *J. Phys. D: Appl. Phys.* 20 (1987) 1421–1437. No Month Available.

Lecchi et al., "Development of Tube Ozonator Technology," pp. A41–A–48. No Date Available.

Masuda, "Ceramic Ozonizer Using High–Frequency Surface Discharge and its Applications," pp. 650–681. No Date Available.

Mechtersheimer, "Influence of Different Dielectric Materials on the Ozone Formation Process," pp. 1–12. No Date Available.

6001 Chemical Abstracts 115(1991) Nov. 4, No. 18, Columbus, Ohio, US, XP000401961 Abstract. No Month Available.

*Primary Examiner*—Kathryn Gorgos
*Assistant Examiner*—Wesley A. Nicolas
*Attorney, Agent, or Firm*—Fish & Richardson P.C.

[57] ABSTRACT

The invention features an ozone generating system including: a housing enclosing a chamber and a device for dissociating oxygen molecules into oxygen atoms within the chamber; an inlet for introducing oxygen molecules into the chamber; a conduit connected to the housing and providing a sealed path from the chamber to an outlet for releasing ozone generated in the system; and a pump operative to draw gases from the chamber into a region of the conduit and generate a pressure in the region that is greater than the pressure in the chamber.

20 Claims, 3 Drawing Sheets

APPARATUS FOR EFFICIENT OZONE GENERATION

BACKGROUND OF THE INVENTION

Ozone is a strong oxidizing agent and a potent bactericide and viricide. Because of such properties, it has been used in the treatment of drinking water. Furthermore, unlike other oxidizing agents such as chlorine, ozone decays into products that are not harmful to the environment. As a result, ozone is being used increasingly in industrial applications, e.g., to eliminate nitrogen oxide from flue gases of fossil fuel power plants.

An ozone generator typically includes an oxygen molecule source, e.g., air, and an energy source, e.g., an electric discharge between two electrodes, for dissociating oxygen molecules into oxygen atoms, which react with the remaining oxygen molecules to form ozone. Most ozone generators use a dielectric barrier discharge, also known as silent discharge. Such ozone generators include a dielectric material positioned adjacent to a first electrode and spaced from a second electrode to form a discharge zone between the dielectric material and the second electrode. The presence of the dielectric material produces a large number of micro-discharges having durations on the order of nanoseconds. The micro-discharges are statistically distributed in space and time, and cause the dissociation of oxygen molecules provided by the oxygen source.

SUMMARY OF THE INVENTION

In general, in one aspect, the invention features an ozone generating system including: a housing enclosing a pair of electrodes separated by a dielectric material, e.g., pyrex glass, the dielectric material and one of the electrodes spaced from one another to define a chamber, wherein the electrodes when energized by a power source dissociate oxygen molecules into oxygen atoms within the chamber; an inlet for introducing oxygen molecules into the chamber; a conduit, e.g., a stainless steel pipe, connected to the housing and providing a sealed path from the chamber to an outlet for releasing ozone generated in the system; and a pump, e.g., a piston pump, operative to draw gases from the chamber into a region of the conduit and generate a pressure in the region that is greater than the pressure in the chamber.

Preferred embodiments of the system can have any of the following features. The pump can be operative to generate a pressure in the chamber of less than 1 about atmosphere, e.g., less than about 500 torr, or in a range of about 200 torr to 400 torr. Also, the pump can be operative to generate a pressure in the region of the conduit that is greater than about 1 atmosphere. Furthermore, the dielectric material and the electrode that define the chamber can be spaced from one another by a distance in a range of about 5 mm to 12 mm, e.g., in a range of about 8 mm to 10 mm.

In general, in another aspect, the invention features an ozone generating system including: a housing enclosing a chamber and a device for dissociating oxygen molecules into oxygen atoms within the chamber; an inlet for introducing oxygen molecules into the chamber; a conduit, e.g., a stainless steel pipe, connected to the housing and providing a sealed path from the chamber to an outlet for releasing ozone generated in the system; and a pump, e.g., a piston pump, operative to draw gases from the chamber into a region of the conduit and generate a pressure in the region that is greater than the pressure in the chamber.

Preferred embodiments of the system can have any of the following features. The device can dissociate oxygen molecules by dielectric barrier discharge, arc discharge, glow discharge, non-equilibrium electric discharge, microwave discharge, thermal discharge, or ultraviolet photodissociation. Also, the pump can be operative to generate a pressure in the chamber of less than 1 about atmosphere, e.g., less than about 500 torr, or in a range of about 200 torr to 400 torr. Furthermore, the pump can be operative to generate a pressure in the region of the conduit that is greater than about 1 atmosphere.

The ozone generating system has many advantages. The ozone generating system substantially increases ozone generation efficiency relative to a conventional ozone generators. The system is also easy to assemble. In particular, the pump and outlet conduit can be easily added to a conventional ozone generator to produce the ozone generating system. Furthermore, the power consumption of the ozone generating system is reduced because of the increased efficiency.

Other features and advantages of the invention will be apparent from the following detailed description, and from the claims.

DETAILED DESCRIPTION

Figure 1:
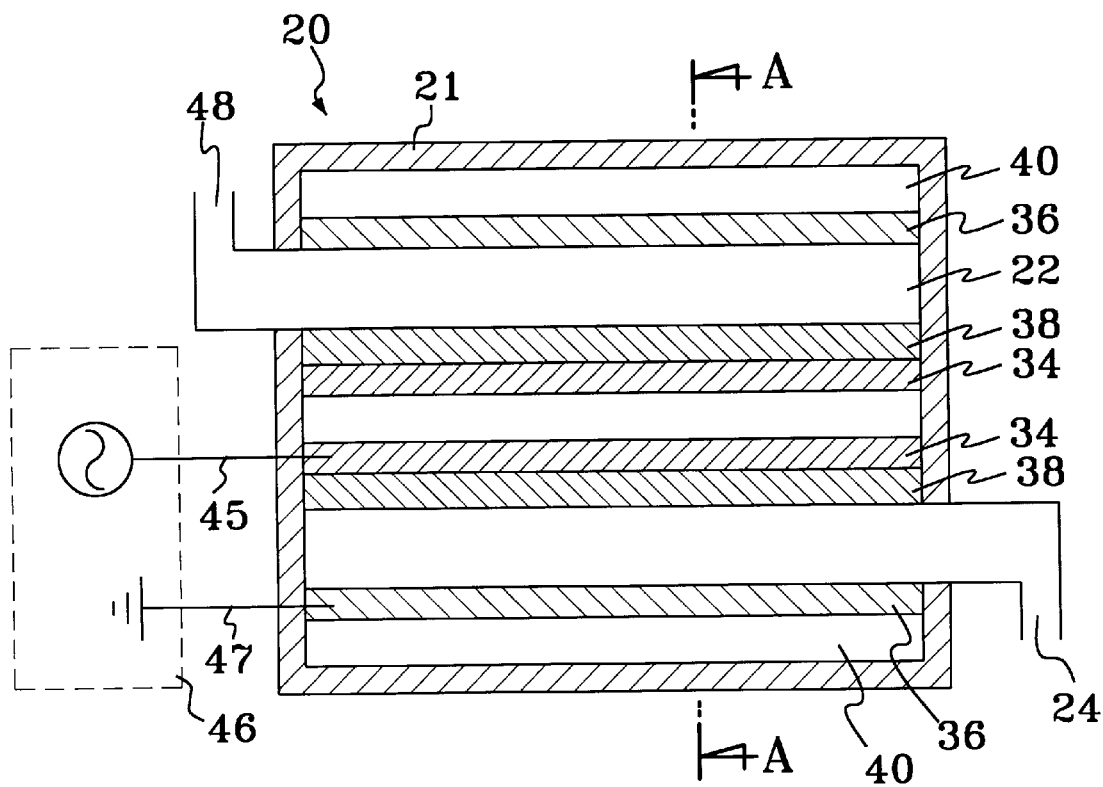
FIG. 1 is a cross-sectional view of a conventional ozone generator along its length.

The invention features an ozone generating system that generates ozone with increased efficiency. The system includes a pump and a sealed outlet conduit attached to an electric discharge chamber that is similar to that of a conventional ozone generator. An inlet port introduces oxygen molecules into the discharge chamber, which, when energized, dissociates some of the oxygen molecules into oxygen atoms. The pump draws the oxygen atoms and the remaining oxygen molecules from the discharge chamber and into the sealed outlet conduit to generate a pressure within the discharge chamber that is less than one atmosphere, e.g., a pressure of about 370 torr, and a pressure within the sealed outlet conduit that is greater than that within the discharge chamber, e.g., about or somewhat greater than 1 atmosphere. The increase in efficiency is based on the discovery that a limiting factor in ozone generation is quenching of oxygen molecules in excited electronic states that lead to oxygen molecule dissociation and oxygen atom formation, in particular, quenching of oxygen molecules in the $B^3E_u^-$ excited electronic state. Reducing the pressure within the discharge chamber reduces such quenching, and thereby increases the production of oxygen atoms. Once the pump draws the oxygen atoms and the remaining oxygen molecules into the sealed outlet conduit, they react with one another to form ozone. The greater pressure in the outlet conduit increases the rate of reaction between the oxygen atoms and the oxygen molecules. The outlet conduit is sealed to prevent mixing of the oxygen atoms and oxygen molecules with gases from sources other than the discharge chamber. The ozone formed within the sealed outlet conduit exits through an outlet valve at an end of the outlet conduit opposite the discharge chamber.

The ozone generating system can be made by simply attaching the pump and sealed outlet conduit to the discharge chamber of a conventional ozone generator. In addition, the discharge chamber of the conventional ozone generator can be reconfigured to optimize oxygen molecule dissociation at reduced pressures less than 1 atmosphere. In particular, the gap spacing between the electrodes of the discharge chamber and the voltage applied across to the electrodes can be optimized to increase oxygen molecule dissociation while preventing voltage breakdown, e.g., arcing between the electrodes. Also, in other embodiments, the ozone generating system can include an oxygen molecule dissociation chamber different from an electric discharge chamber, such as a microwave discharge chamber or a chamber exposed to ultraviolet radiation. In such cases, the pump again draws the oxygen atoms formed within the oxygen molecule dissociation chamber and the remaining oxygen molecules into the sealed outlet conduit, such that the pressure within the oxygen dissociation chamber is less than 1 atmosphere, e.g., about 370 torr, and the pressure within the sealed outlet conduit is greater than that within the sealed outlet conduit, e.g., about or somewhat greater than 1 atmosphere.

Figure 2:
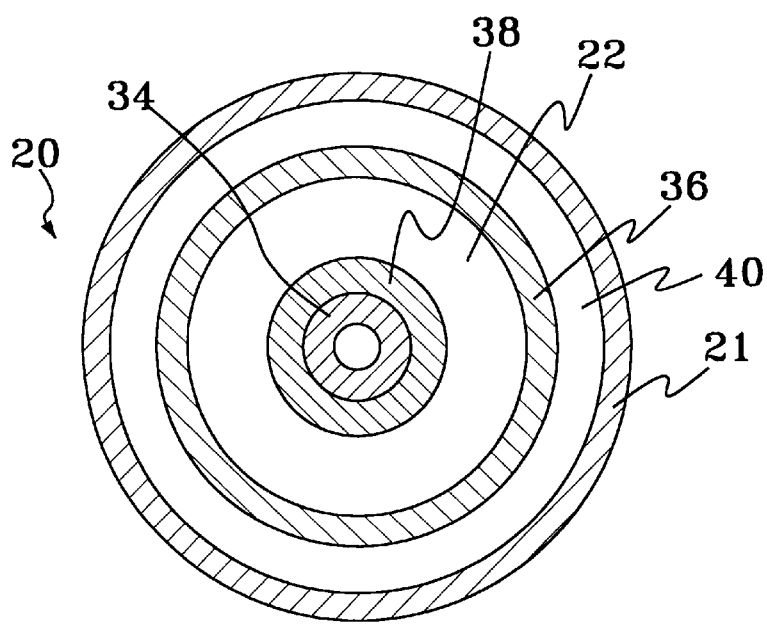
FIG. 2 is a cross-sectional view of the conventional ozone generator of FIG. 1 along its width.

FIGS. 1 and 2 show cross-sectional schematics of a conventional dielectric barrier discharge ozone generator 20 having an outer housing 21 and an interior discharge chamber 22. FIG. 2 is a cross-sectional view of ozone generator 20 along a plane that is perpendicular to the plane of FIG. 1 and contains the axis A—A shown in FIG. 1. Ozone generator 20 includes inner and outer, concentric stainless steel tubes, which form electrodes 34 and 36, respectively. In other embodiments, the electrodes can be made of conductive materials other than stainless steel. Surrounding inner electrode 34 is a cylindrical dielectric tube 38 made of a suitable dielectric material, e.g., pyrex glass. The space between outer electrode 36 and dielectric tube 38 forms discharge chamber 22. Oxygen molecules from an oxygen source flow into discharge chamber 22 through an oxygen inlet port 24. The distance between dielectric tube 38 and outer electrode 36 is known as the discharge gap thickness.

Electrodes 34 and 36 connect to an AC voltage source 46 through wires 45 and 47, respectively. When voltage source 46 energizes electrodes 34 and 36, the electrodes generate micro-discharges between dielectric plate 38 and electrode 36. The micro-discharges cause dissociation of oxygen molecules within discharge chamber 22 to form oxygen atoms. The oxygen atoms then react with undissociated oxygen molecules to form ozone. Ozone exits chamber 22 through an outlet port 48, which directs the ozone to a storage chamber or a processing chamber requiring ozone.

Ozone generator 20 also include a cooling water flow path 40 in thermal contact with electrode 36, which prevents overheating of the ozone generator. A cooling water reservoir 32 (shown in FIG. 3) provides the water for flow path 40.

A suitable range of voltages and frequencies for voltage source 46 and a suitable discharge gap thickness are known in the art and depend on the rate of ozone formation desired. See, e.g., Ph. Lecci and J. E. Petitimbert (*Proceedings of the 8th Ozone World Congress,* 1:A41–A48, 1987) or B. Elliasson et al. (*J. Phys. D: Appl. Phys.,* 20:1421–1437, 1987). For example, typical values are: 10,000 volts at 60 Hz and a discharge gap thickness of 3 mm.

Figure 3:
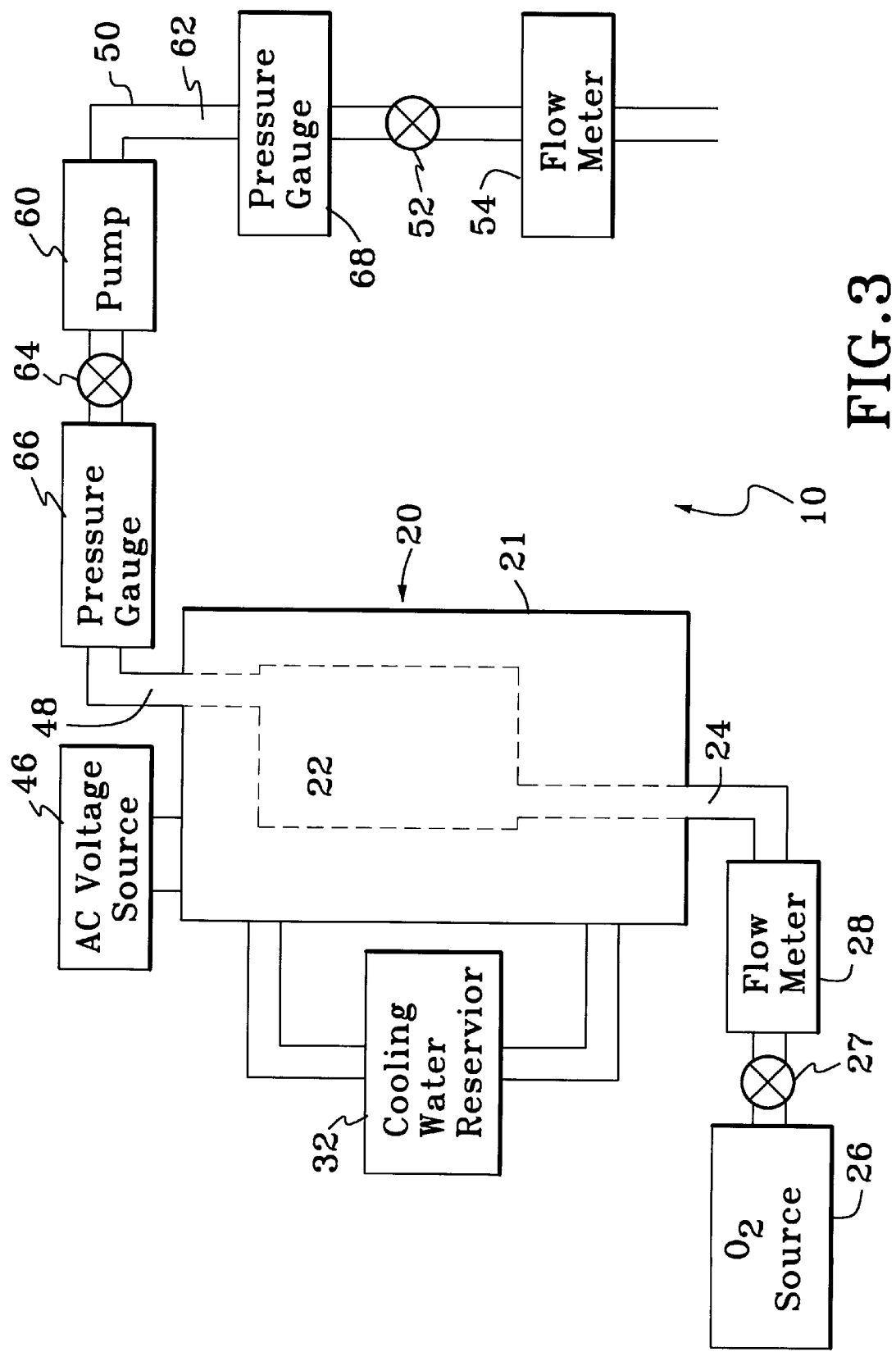
FIG. 3 is a schematic of an ozone generating system using the conventional ozone generator shown in FIGS. 1 and 2.

FIG. 3 shows a schematic of an ozone generating system 10 employing the conventional ozone generator 20 shown in FIGS. 1 and 2. Oxygen molecules from an oxygen source 26 flow through oxygen inlet port 24 into chamber 22 within housing 21. An inlet valve 27 adjusts the inflow rate of the oxygen, which is measured by a flow meter 28. Oxygen source 26 can vary depending on the particular embodiment, e.g., oxygen source 26 can be the ambient environment from which air passes into chamber 22, or a pressurized source of relatively pure oxygen.

System 10 also includes a piston pump 60 connected to outlet port 48. Piston pump 60 draws on the gases in chamber 22 and pushes them into the interior of a sealed outlet pipe 50, e.g., a stainless steel tube. Thus, the interior of the outlet pipe forms a collision zone region 62 in which pump 60 generates a pressure that is greater than the pressure in chamber 22. An intermediate valve 64 positioned between outlet port 48 and piston pump 50 is used to adjust the pressure in chamber 22. Pressure gauges 66 and 68 measure the pressure in chamber 22 and collision zone region 62, respectively.

With piston pump 60 activated, the inflow rate of oxygen molecules and the pressure in chamber 22 can be controlled by adjusting inlet valve 27 and intermediate valve 64. Reducing the pressure in chamber 22 to less than 1 atmosphere, e.g., in the range of about 200 torr to 600 torr, or more particularly in the range of about 200 torr to 400 torr, reduces quenching of oxygen molecules in excited electronic states that lead to oxygen dissociation, thereby increasing the formation of oxygen atoms. Piston pump 60 draws the oxygen atoms and the undissociated oxygen molecules, as well as any ozone formed by the reaction of the oxygen atoms and oxygen molecules, into collision zone region 62 of outlet pipe 50. Because of piston pump 60, the pressure in collision zone region 62 is greater than the pressure in chamber 22, and is typically greater than 1 atmosphere. The pressure in the collision zone region can be adjusted by outlet valve 52, which also controls the outflow rate. A second flow meter 54 measures the outflow rate. The greater pressure in collision zone region 62 increases the rate of reaction between the oxygen atoms and oxygen molecules drawn from chamber 22, which react with one another to form ozone. In addition, oxygen atoms that remain in the gas stream beyond outlet valve 52 can continue to react with oxygen molecules to form ozone.

Outlet pipe 50 is sealed between intermediate valve 84 and outlet valve 52 to prevent introduction of gases from sources other than chamber 22 into collision zone region 62 and to allow the oxygen atoms and oxygen molecules from chamber 22 to react with one another in collision zone region 62 at a pressure greater than that within chamber 22. Although FIG. 2 depicts outlet pipe 50 having a right-angle turn, in other embodiments the outlet pipe can have a different shape, e.g., it can be straight or curved and can have rectangular or elliptical cross-sections.

Ozone generating system 10 can be assembled quite simply by adding pump 60, outlet pipe 50, valves 64 and 52, and pressure gauges 66 and 68 to conventional ozone generator 20. To operate ozone generating system 10 under specific flow rate conditions, e.g., those of conventional ozone generator 20, one carries out the following steps. After the piston pump is turned on, inlet valve 27 and intermediate valve 68 are adjusted until flow meter 28 indicates the desired inflow rate and pressure gauge 66 indicates that the desired pressure for chamber 22, e.g., 370 torr. Then, outlet valve 52 is adjusted until flow meter 54 indicates the desired outflow rate. In such cases, the increase in ozone concentration passing through flow meter 54 in ozone generating system 10 can be two to five times greater than the ozone concentration exiting through outlet port 48 of conventional ozone generator 20 when operated separately from system 10 under conventional conditions, i.e., a pressure in chamber 22 of about 1 atm. In this comparison, ozone generating system 10 and conventional ozone generator 20 operate under discharge conditions that optimize the performance of the conventional ozone generator at 1 atm, e.g., an applied voltage of 10,000 volts at 60 Hz and a discharge gap thickness of 3 mm.

To further improve the efficiency of ozone generating system 10, the discharge conditions of ozone generator 20 are altered to optimize the ozone concentration exiting flow meter 54. In particular, since the pressure in chamber 22 is less than 1 atm when conventional ozone generator 20 is used as a component of ozone generating system 10, the applied voltage and discharge gap thickness are altered to optimize the ozone concentration exiting flow meter 54 as a function of the pressure in chamber 22. In general, ozone generation increases with applied voltage. However, the applied voltage is limited by voltage breakdown between electrodes 34 and 36, placing an upper limit on the applied voltage. Ozone generation is optimized by using an applied voltage only slightly smaller than the voltage at which voltage breakdown occurs, i.e., the breakdown voltage.

The breakdown voltage increases with discharge gap thickness and pressure. Thus, to optimize the performance of ozone generating system 10 under conditions of reduced pressure in chamber 22, e.g., less than 1 atm, the discharge gap thickness is increased relative to that of a conventional ozone generator operated under conventional conditions. This allows system 10 to operate at applied voltages equal to or higher than those of the conventional ozone generator operated under conventional conditions. For example, if conventional conditions for conventional ozone generator 20 operating separately from system 10 with a pressure of 1 atm in chamber 22 are an applied voltage of "V" and a discharge gap thickness of "d," optimal conditions for ozone generating system 10 including ozone generator 20 are a pressure in chamber 22 in the range of about 300 to 400 torr, e.g., about 300 torr, an applied voltage in the range of about V to 2 V, e.g., about 1.5 V, and a discharge gap thickness in the range of about 2 d to 3.5 d, e.g., 3 d. In particular, if V=10,000 V and d=3 mm are optimal conditions for conventional ozone generator 20 operating alone with a pressure of 1 atm in chamber 22, the discharge gap thickness for system 10 can be in the range of about 6 to 12 mm, e.g., 9 mm, and the applied voltage can be in the range of about 13,000 to 20,000 V, e.g., about be 15,000 V.

In other embodiments, the piston pump can be replaced with other pumps that are known in the art, including, for example, oil-free pumps or pumps utilizing a nozzle and fluid jet. Furthermore, the ozone generating system can include a device for dissociating oxygen molecules that is different from a conventional dielectric barrier ozone generator. For example, ozone generator 20 in system 10 of FIG. 3 can be replaced with a device that dissociates oxygen molecules according mechanisms that are different from dielectric barrier discharge, e.g., arc discharge, glow discharge, non-equilibrium electric discharge, microwave discharge, thermal discharge, and ultraviolet photodissociation, each of which is known in the art. Other than this device, such a system is similar to FIG. 3, the device dissociates oxygen molecules in chamber 22 within housing 21 and pump 60 draws the resulting oxygen atoms and remaining oxygen molecules into sealed outlet pump 50.

Figure 4:
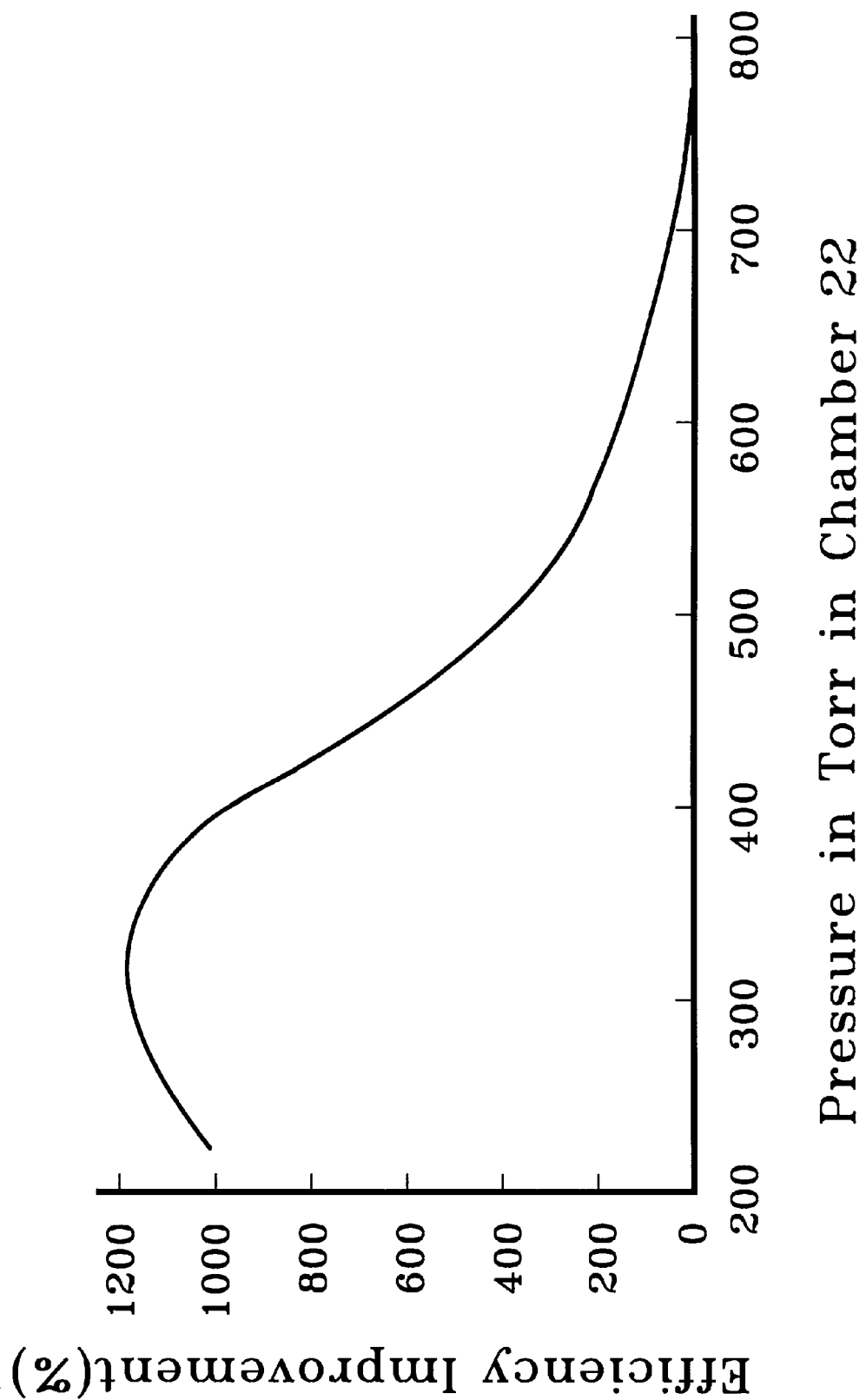
FIG. 4 is a graph illustrating the improvements in ozone production efficiency for the ozone generating system shown in FIG. 3 operating under the following conditions: pressure in collision zone region equals 790 torr; outlet flow rate equals 3 SCFH; and applied voltage equals 7000 volts.

In each of the embodiments, the ozone generating system includes a pump that produces a pressure in the oxygen molecule dissociation chamber, e.g., chamber 22, that is less than 1 atmosphere, e.g., in the range of about 200 to 600 torr, or more particularly in the range of about 200 to 400 torr. The pump draws the oxygen atoms produced in the oxygen molecule dissociation chamber and the undissociated oxygen molecules remaining in the chamber into a relatively high pressure, e.g., greater than or equal to 1 atmosphere, collision zone region downstream of the oxygen molecule dissociation chamber. As shown in FIGS. 3 and 4, the collision zone region can be the interior of an outlet pipe. In other embodiments, a separate, sealed chamber downstream of the pump can include the collision zone region. Other than the oxygen atoms and undissociated oxygen molecules drawn into the collision zone region from the oxygen molecule dissociation chamber by the pump, no additional gases are required for the efficient formation of ozone, thus the outlet pipe or separate chamber is sealed to prevent the introduction of additional gases into the collision zone region.

Without further elaboration, it is believed that the above description has adequately enabled the present invention. The following specific embodiments are, therefore, to be construed as merely illustrative, and not limitative of the remainder of the disclosure in any way whatsoever. All of the publications cited herein, including patents, are hereby incorporated by reference in their entirety.

EXAMPLE

A conventional dielectric barrier discharge ozone generator similar to the one shown in FIGS. 1 and 2 was built using 30 cm long stainless steel tubing for the cylindrical electrodes and a 30 cm long tube of pyrex glass as the dielectric tube. The dielectric tube surrounded and contacted the inner electrode, and had a diameter of 3 cm. The outer electrode was spaced from the dielectric tube by 3 mm to form the discharge chamber. Then, the elements shown in FIG. 3 were added to the conventional ozone generator to form the ozone generating system. In particular, a stainless steel pipe having an outside diameter of ¼ inch was attached to the outlet port of the conventional ozone generator to form the outlet pipe and a commercial 13–15 liter/minute air pump (Iwaki, Model No. AP-115N) was used as the pump. Unlike the outlet pipe shown in FIG. 3, the outlet pipe in this example was straight. The length of the collision zone region, i.e., the region of outlet pipe between the pump and the outlet valve was about 30 cm.

The following experiment was performed using the above ozone generating system. Air at 790 torr was supplied into the discharge chamber of the conventional ozone generator at a flow rate of 3 standard cubic feet per hour (SCFH), where 1 SCFH equals about 0.472 liters/min. The flow rate of gases exiting from the collision zone region of the outlet pipe was 3 SCFH. The applied voltage was 10,000 V at 60 Hz. Using the pump, the pressure in the discharge chamber of the conventional ozone generator was varied as the pressure in the collision zone region was kept at 790 torr. The inlet, intermediate, and outlet valves were adjusted to maintain the input flow rate of 3 SCFH and the output flow rate of 3 SCFH. The ozone concentration for the output gases was measured using iodometric methods well known in the art, see, for example, B. E. Saltman and N. Gilbert (*Anal. Chem.,* 31:1914, 1959).

When the pressure in the discharge chamber of the conventional ozone generator was set 790 torr, the system was equivalent to the conventional ozone generator since the pressures in the discharge chamber and the collision zone region were the same. Under such conditions, ozone production was measured to be 1.8 mg/liter/min. When the pressure in the discharge chamber of the conventional ozone generator was reduced to 370 torr, ozone production was measured to be 2.76 mg/liter/min, an improvement of 53 percent.

In another experiment, conditions were the same as above except that the applied voltage was reduced to 7,000 V at 60 Hz. Under these conditions, the pressure in the discharge chamber could be reduced to about 200 torr without voltage breakdown. Ozone efficiency was measured for pressures in the discharge chamber ranging from 200 torr to 790 torr, with the pressure in the collision zone region being fixed at 790 torr. The results obtained are shown in FIG. 4, which plots the relative improvement in ozone production as a function of pressure in the discharge chamber. The relative improvement is given by the difference between the ozone production of the improved ozone generator and the ozone production of the conventional ozone generator, divided by the ozone production of the conventional ozone generator, and expressed in percent. As in the first experiment, the ozone production of the conventional ozone generator corresponds to the ozone production measured when the pressure in the discharge chamber was 790 torr. FIG. 4 shows that ozone production is substantially improved by as much as 1200 percent. The absolute values of ozone production in this case were 0.156 mg/l/min at 767 torr and 2.0 mg/l/min at 304 torr.

For industrial applications, the ozone generating system in the above example would be scaled up in size and the discharge gap thickness and applied voltage would be optimized.

Other aspects, advantages, and modifications are also within the scope of the following claims.

What is claimed is:

1. An ozone generating system comprising:
   a housing enclosing a pair of electrodes separated by a dielectric material, the dielectric material and one of the electrodes spaced from one another to define a chamber, wherein the electrodes when energized by a power source dissociate oxygen molecules into oxygen atoms within the chamber;
   an inlet for introducing oxygen molecules into the chamber;
   a conduit connected to the housing and providing a sealed path from the chamber to an outlet for releasing ozone generated in the system; and
   a pump, a first valve at the inlet, a second valve between the housing and the conduit, and a third valve at the outlet for generating a pressure in the chamber that is less than that in the conduit.

2. The system of claim 1, wherein the conduit is a pipe.

3. The system of claim 1, wherein the conduit is a stainless steel pipe.

4. The system of claim 1, wherein the pump is a piston pump.

5. The system of claim 1, wherein the pump and valves are operative to generate a pressure in the chamber of less than about 1 atmosphere.

6. The system of claim 5, wherein the pump and valves are operative to generate a pressure in the chamber less than about 500 torr.

7. The system of claim 6, wherein the pump and valves are operative to generate a pressure in the chamber in a range of about 200 torr to 400 torr.

8. The system of claim 6, wherein the pump and valves are operative to generate a pressure in the conduit that is greater than about 1 atmosphere.

9. The system of claim 1, wherein the dielectric material and the electrode that define the chamber are spaced from one another by a distance in a range of about 5 mm to 12 mm.

10. The system of claim 9, wherein the dielectric material and the electrode that define the chamber are spaced from one another by a distance in a range of about 8 mm to 10 mm.

11. The system of claim 8, wherein the dielectric material and the electrode that define the chamber are spaced from one another by a distance in a range of about 8 mm to 10 mm.

12. An ozone generating system comprising:
   a housing enclosing a chamber and a device for dissociating oxygen molecules into oxygen atoms within the chamber;
   an inlet for introducing oxygen molecules into the chamber;
   a conduit connected to the housing and providing a sealed path from the chamber to an outlet for releasing ozone generated in the system; and
   a pump, a first valve at the inlet, a second valve between the housing and the conduit, and a third valve at the outlet for generating a pressure in the chamber that is less than that in the conduit.

13. The system of claim 12, wherein the device dissociates oxygen molecules by dielectric barrier discharge, arc discharge, glow discharge, non-equilibrium electric discharge, microwave discharge, thermal discharge, or ultraviolet photodissociation.

14. The system of claim 12, wherein the conduit is a pipe.

15. The system of claim 12, wherein the conduit is a stainless steel pipe.

16. The system of claim 12, wherein the pump is a piston pump.

17. The system of claim 12, wherein the pump and the valves are operative to generate a pressure in the chamber of less than about 1 atmosphere.

18. The system of claim 17, wherein the pump and the valves are operative to generate a pressure in the chamber less than about 500 torr.

19. The system of claim 18, wherein the pump and the valves are operative to generate a pressure in the chamber in a range of about 200 torr to 400 torr.

20. The system of claim 18, wherein the pump and the valves are operative to generate a pressure in the conduit that is greater than about 1 atmosphere.

* * * * *